(12) United States Patent
Pelosi et al.

(10) Patent No.: US 9,225,381 B2
(45) Date of Patent: Dec. 29, 2015

(54) TUNABLE QUALITY FACTOR

(71) Applicant: Intel Mobile Communications GmbH, Neubiberg (DE)

(72) Inventors: Mauro Pelosi, Aalborg (DK); Alexandru Daniel Tatomirescu, Aalborg (DK); Mikael Bergholz Knudsen, Gistrup (DK); Gert F. Pedersen, Storvorde (DK); Osama Nafeth Alrabadi, Aalborg (DK); Samantha Caporal Del Barrio, Aalborg (DK); Poul Olesen, Stovring (DK); Peter Bundgaard, Aalborg (DK)

(73) Assignee: Intel Deutschland GmbH, Neubiberg (DE)

( * ) Notice: Subject to any disclaimer, the term of this patent is extended or adjusted under 35 U.S.C. 154(b) by 178 days.

(21) Appl. No.: 13/792,885

(22) Filed: Mar. 11, 2013

(65) Prior Publication Data

US 2014/0256273 A1    Sep. 11, 2014

(51) Int. Cl.

| | |
|---|---|
| H04B 7/04 | (2006.01) |
| H04B 7/08 | (2006.01) |
| H04B 1/44 | (2006.01) |
| H01Q 5/321 | (2015.01) |
| H01Q 9/04 | (2006.01) |
| H01Q 21/28 | (2006.01) |
| H04B 1/00 | (2006.01) |

(52) U.S. Cl.
CPC ............. *H04B 1/44* (2013.01); *H01Q 5/321* (2015.01); *H01Q 9/04* (2013.01); *H01Q 21/28* (2013.01); *H04B 1/0053* (2013.01)

(58) Field of Classification Search
USPC ........ 455/121, 193.1, 269, 272, 276.1, 277.1, 455/101, 107, 120, 123, 125, 273, 275, 455/277.2
See application file for complete search history.

(56) References Cited

U.S. PATENT DOCUMENTS

| | | | |
|---|---|---|---|
| 7,808,798 B2 | 10/2010 | Cotte et al. | |
| 2010/0065647 A1* | 3/2010 | Ritamaki et al. | 235/492 |
| 2012/0049791 A1 | 3/2012 | Tanabe | |
| 2014/0187150 A1* | 7/2014 | McFarthing | 455/41.1 |

FOREIGN PATENT DOCUMENTS

| | | |
|---|---|---|
| CN | 102177612 A | 9/2011 |
| WO | 2012027703 A2 | 3/2012 |
| WO | 2012064665 A2 | 5/2012 |
| WO | 2012166556 A1 | 12/2012 |

* cited by examiner

*Primary Examiner* — Blane J Jackson
(74) *Attorney, Agent, or Firm* — Eschweiler & Associates, LLC

(57) ABSTRACT

The present disclosure relates to a wireless communication system configured to transforming the radiating mechanism of the antenna system in such a way to support different operating modes depending on the needs. In some examples, the wireless communication system comprises an antenna structure connected to a signal process unit. The antenna structure comprises a radiating mechanism configured to transmit or receive electromagnetic radiation. A switchable operating mode element is configured to receive a signal and to dynamically vary a quality factor of the radiating element by selectively routing the signal along one of a plurality of signal paths, which respectively provide different antenna parameters to the radiating mechanism, based upon a current operating mode of the wireless communication system. By dynamically varying a quality factor of the radiating element, the wireless communication system can effectively support different operating modes.

17 Claims, 5 Drawing Sheets

TUNABLE QUALITY FACTOR

BACKGROUND

Wireless communication devices (e.g., cell phones, PDAs, notebook computers, etc.) are configured to wirelessly transmit and receive a radio frequency (RF) signal by exciting one or more radiators (e.g., antennas) with the RF signal. To ensure that a signal is properly transmitted or received, a degree of isolation is present between the signal to be transmitted/received and other signals in the wireless communication system. Without such isolation, performance of the wireless communication system is degraded.

For example, MIMO (multi-input multi-output) antenna arrays comprise a plurality of antennas configured to respectively convey separate data streams collectively corresponding to an overall data signal. Isolation between the plurality of antennas ensures that the separate data streams remain independent of one another. Without such isolation, one or more of the data streams may become distorted such that the overall data signal cannot be recovered by a receiver.

DETAILED DESCRIPTION

Figure 1:
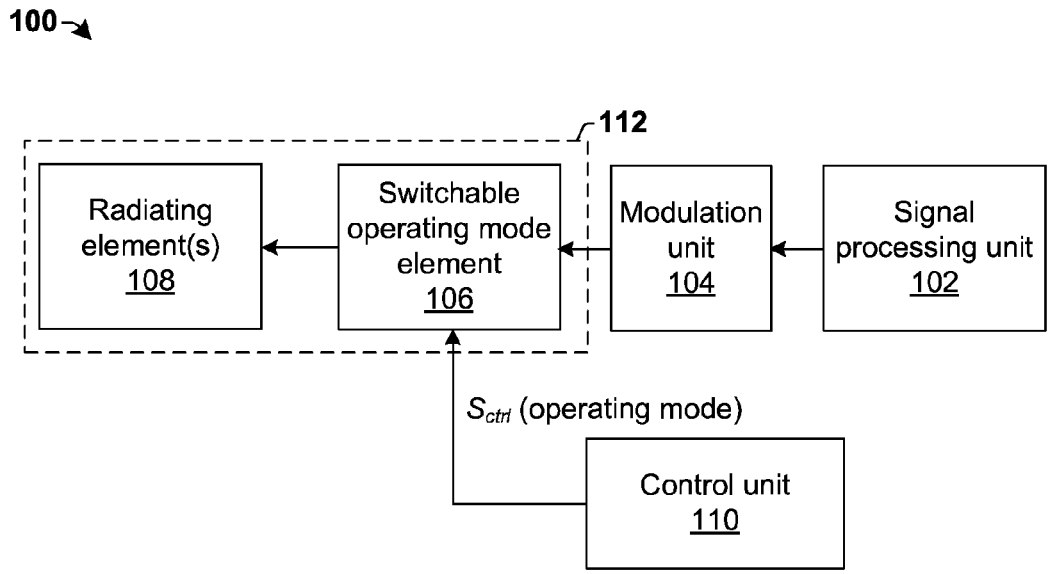
FIG. 1 illustrates a block diagram of a disclosed wireless communication system configured to support different operating modes by dynamically varying one or more antenna parameters.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

As the number of users and functionality of wireless communication devices increases, many modern communication systems have begun to use a plurality of frequency bands to transmit and/or receive data. Modern wireless communication devices that utilize different frequency bands often comprise multiple-antenna systems. To operate over multiple frequency bands, mutual coupling between antennas is minimized to isolate signals of each frequency band from signals of another frequency band. To achieve such isolation, a duplex filter may be connected between a signal path and an antenna.

The quality factor (Q-factor) of an antenna, defined as a ratio between power stored in a reactive field and a radiated power, is an indicator of mutual coupling (i.e., isolation). As the bandwidth of an antenna is reduced, the Q-factor of the antenna increases, such that antennas with a high Q-factor are narrowband antennas, while antennas with a low Q-factor are wideband antennas. Narrow-band antennas inherently have a lower degree of mutual coupling with other antennas integrated onto a same handset.

However, during operation antenna systems may undergo dynamic changes that can vary the mutual coupling between antennas of a multi-antenna array. For example, antennas may operate over different communication standards and/or frequency bands, or may experience different losses and envelope correlation coefficients depending on the relative position of a user's hand with respect to a handset. Such dynamic changes in the operating mode of a wireless communication device may lead to varying degrees of mutual coupling in an antenna system and can have a negative effect on performance of the antenna system.

Accordingly, the present disclosure relates to a wireless communication system configured to transform the radiating mechanism of an antenna structure in such a way as to support different operating modes. The wireless communication system comprises an antenna structure connected to a signal process unit. The antenna structure comprises a radiating mechanism configured to transmit or receive electromagnetic radiation. A switchable operating mode element is configured to receive a signal and to dynamically vary a quality factor of the radiating element by selectively routing the signal along one of a plurality of signal paths, which respectively provide different antenna parameters to the radiating mechanism, based upon a current operating mode of the wireless communication system. By dynamically varying a quality factor of the radiating element, the wireless communication system can effectively support different operating modes.

FIG. 1 illustrates a block diagram of a disclosed wireless communication system 100 configured to support different operating modes by dynamically varying one or more antenna parameters.

The wireless communication system 100 (e.g., transceiver system) comprises a signal processing unit 102. The signal processing unit 102 is coupled to an antenna structure 112 by way of a modulation element 104. The signal processing unit 102 is configured to generate signals that are provided to the antenna structure 112 for transmission and/or to process signals received from the antenna structure 112. In some examples, the signal processing unit 102 comprises a baseband processor. The modulation element 104 is configured to modulate or demodulate signals exchanged between the signal processing unit 102 and the antenna structure 112.

The antenna structure 112 comprises a switchable operating mode element 106 and a radiating mechanism 108 having one or more radiating elements. The switchable operating mode element 106 is configured dynamically vary one or more antenna parameters of the radiating mechanism 108 based upon a current operating mode of the wireless communication system 100. For example, in various examples, the switchable operating mode element 106 is configured dynamically vary one or more antenna parameters of the radiating mechanism 108 based upon a communication standard and/or a frequency band that is used by the wireless communication system 100.

The one or more antenna parameters may comprise a quality factor (Q-factor) of the radiating mechanism 108. The Q-factor of the radiating mechanism 108 corresponds to a degree of mutual coupling of the radiating mechanism 108. For example, an antenna having a large Q-factor (i.e., a high-Q antenna) causes a lower degree of mutual coupling than an antenna having a lower Q-factor. Therefore, by dynamically varying the Q-factor of the radiating mechanism 108, the mutual coupling of the radiating mechanism can be dynamically varied. It will be appreciated that the switchable operating mode element 106 may vary the Q-factor by directly varying the Q-factor or by indirectly varying other antenna parameters, such as an input impedance, for example.

In some cases, a control unit 110 is connected to the switchable operating mode element 106. The control unit 110 is configured to determine the current operating mode based of the wireless communication system 100 (e.g., based upon a wireless communication standard and/or a frequency band used by the wireless communication system) and to generate a control signal $S_{ctrl}$ based upon the current operating mode that has a value that is a function of a current operating mode of the wireless communication system 100. The control signal $S_{ctrl}$ is provided to the switchable operating mode element 106, wherein the control signal $S_{ctrl}$ controls operation of the switchable operating mode element 106. As the operating mode of the wireless communication system 100 changes, the value of the control signal $S_{ctrl}$ changes, dynamically varying one or more variable antenna parameters by dynamically changing a state of the switchable operating mode element 106. By dynamically varying the one or more variable antenna parameters, the radiating mechanism 108 can be adaptively changed to support different operating modes.

Figure 2A:
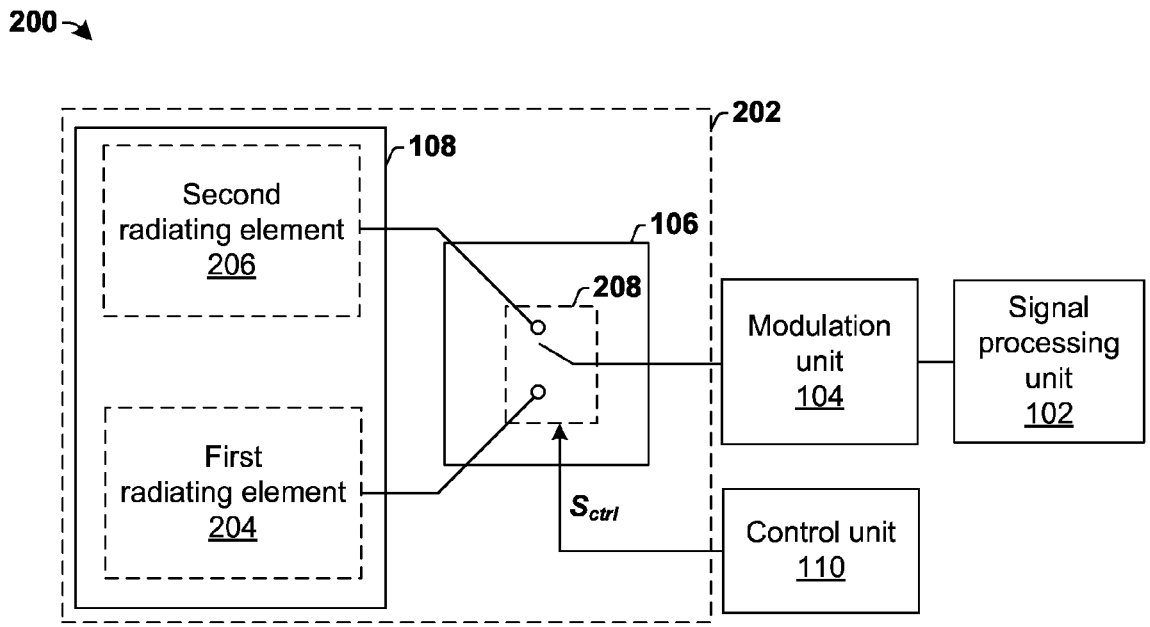
FIG. 2A illustrates a schematic diagram of a disclosed wireless communication system configured to dynamically support different operating modes.

FIG. 2A illustrates a schematic diagram of a wireless communication system 200 having a switchable operating mode element configured to provide a variable quality factor (e.g., isolation level).

The wireless communication system 200 comprises an antenna structure 202 having a switchable operating mode element 106 and a radiating element 108. The switchable operating mode element 106 may comprise a switching element 208. The switching element 208 is configured to receive a signal and to selectively route the signal along one of a plurality of signal different paths. The different signal paths provide different antenna parameters to the radiating mechanism 108, such that by selectively routing the signal along one of the plurality of different signal paths the switching element 208 varies one or more antenna parameters of the radiating mechanism 108.

For example, the switchable operating mode element may comprise a switching element 208 configured to route a signal along a first signal path by selectively coupling the signal processing unit 102 to a first radiating element 204 or to route the signal along a second signal path by selectively coupling the signal processing unit 102 to a second radiating element 206. In some examples, the first radiating element 204 may comprise a high-Q antenna, while the second radiating element 206 may comprise a low-Q antenna having a Q-factor that is smaller than that of the high-Q antenna.

Although switching element 208 is illustrated as switching between a first and second radiating elements, 204 and 206, it will be appreciated that the switching element 208 may be configured to switch between any number of radiating elements. For example, the switching element may be configured to switch between a first antenna having a first Q-factor, a second antenna having a second Q-factor greater than the first Q-factor, and a third antenna having a third Q-factor greater than the second Q-factor.

A control unit 110 is configured to provide a control signal $S_{ctrl}$ to the switching element 208. The control signal $S_{ctrl}$ operates the switching element based upon a current operating mode of the wireless communication system 200. The control signal $S_{ctrl}$ is a function of a current operating mode of the wireless communication system 200. For example, if the wireless communication system 200 is configured to operate according to a first communication standard the control signal $S_{ctrl}$ will have a first value that selectively operates the switching element 208 to couple the first radiating element 204 to the chassis 302. Alternatively, if the wireless communication system 200 is configured to operate according to a second communication standard the control signal $S_{ctrl}$ will have a second value that selectively operates the switching element 208 to couple the second radiating element 206 to the chassis 302.

Figure 2B:
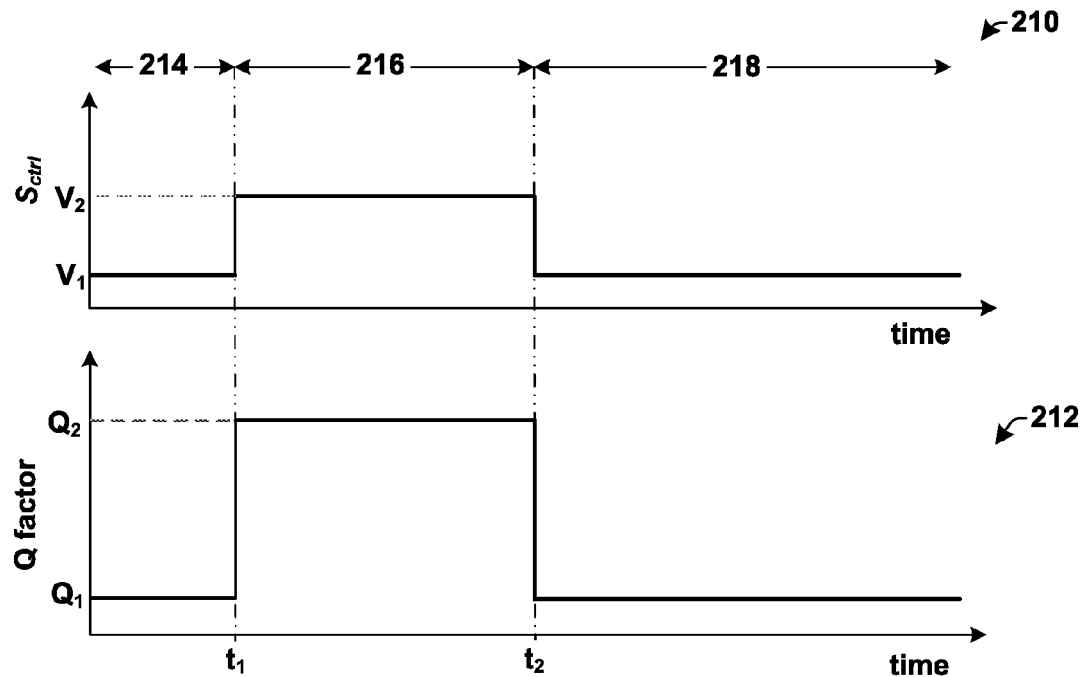
FIG. 2B illustrates a timing diagram illustrating operation of the wireless communication system of FIG. 2A.

For example, FIG. 2B illustrates exemplary timing diagrams, 210 and 212, showing some examples of a dynamically varying quality factor (Q-factor) of the radiating element 108 of FIG. 2A.

As shown in timing diagram 210, during a first period 214, the control signal $S_{ctrl}$ has a first value $V_1$. The first value $V_1$ causes switching element 208 to couple the signal processing unit 102 to the first radiating element 204, which results in the wireless communication system 200 having a first Q-factor, $Q_1$, as shown in timing diagram 212.

At time $t_1$, an operating mode (e.g., a communication standard, a frequency band, etc.) of the wireless communication system 200 changes. As shown in timing diagram 210, in response to a change in the operating mode the control signal $S_{ctrl}$ changes to a second value $V_2$, during a second period 216. The second value $V_2$ causes switching element 208 to couple the signal processing unit 102 to the second radiating element 206, which results in the wireless communication system 200 having a second Q-factor, $Q_2$, as shown in timing diagram 212. The second Q-factor, $Q_2$, is larger than the first Q-factor, $Q_1$.

At time $t_2$, an operating mode of the wireless communication system 200 changes again. As shown in timing diagram 210, in response to a change in the operating mode the control signal $S_{ctrl}$ changes back to the first value $V_1$, during a third period 218. The first value $V_1$ causes switching element 208 to couple the signal processing unit 102 to the first radiating element 204, which results in the wireless communication system 200 having the first Q-factor, $Q_1$, as shown in timing diagram 212.

By switching between the broad band/low-Q, first radiating element 204 and the narrow band/high-Q, second radiating element 206, the radiating mechanism 108 can be adaptively changed to support different operating modes. For example, use of the low-Q, first radiating element 204 can increase bandwidth of the wireless communication system 200, while use of the high-Q, second radiating element 206 can significantly reduce the level of mutual coupling in a multiple antenna system.

Figure 3:
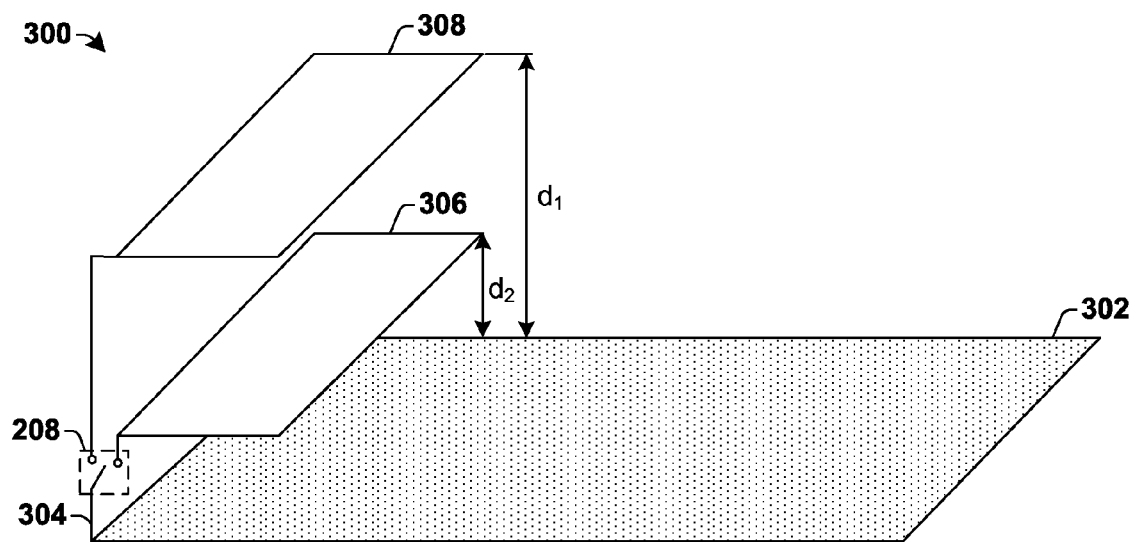
FIG. 3 illustrates a three-dimensional view of an antenna structure having a low-Q antenna and a high-Q antenna, configured to provide a variable quality factor.

FIG. 3 illustrates a three-dimensional view of an antenna structure 300, having a low-Q antenna 306 and a high-Q antenna 308, configured to support different operating modes by dynamically varying a quality factor of the antenna structure 300.

The antenna structure 300 comprises a chassis 302, a feed line 304, a low-Q antenna 306, and a high-Q antenna 308. The chassis 302 comprises a conductive material having a planar structure. The chassis 302 acts as a ground plane, which contributes to the radiation output from the antenna structure 300. For example, the ground plane may be configured to reflect signals resonated from the low-Q antenna 306 or the high-Q antenna 308. The chassis 302 may comprise a metal such as copper or gold, for example.

The low-Q antenna 306 and the high-Q antenna 308 are located above the chassis 302 and are selectively coupled to the feed line 304 by way of a switching element 208. The switching element 208 is configured to selectively operate either the low-Q antenna 306 or the high-Q antenna 308 at a given time by connecting the feed line 304 to the low-Q antenna 306 or to the high-Q antenna 308, respectively. The switching element 208 may be configured to operate based upon a control signal $S_{ctrl}$ that has a value that is a function of a current operating mode of the system. The control signal $S_{ctrl}$ causes the switching element 208 to selectively operate either the low-Q antenna 306 or the high-Q antenna 308 depending on the current operating mode of the system.

In some cases, the low-Q antenna 306 is stacked over the chassis 302 at a position that is vertically above the high-Q antenna 308, such that the low-Q antenna 306 is separated from the chassis 302 by a first distance $d_1$ and the second antenna is separated from the chassis by a second distance $d_2$. Since the impedance bandwidth of an antenna is a function of the distance between the antenna and the chassis, the different distances, $d_1$ and $d_2$, enable variation of the impedance bandwidth of the antenna structure 300. For example, the smaller distance $d_2$ between the high-Q antenna 308 and the chassis 302 cause the high-Q antenna 308 to have a narrower impedance bandwidth than that of the low-Q antenna 306, resulting in the high-Q antenna 308 having a larger Q-factor than the low-Q antenna 306.

It will be appreciated that although the low-Q antenna 306 and the high-Q antenna 308 are illustrated as planar inverted F antennas (PIFAs), other antenna types may be used. For example, the low-Q antenna 306 and the high-Q antenna 308 may comprise alternative antenna types, such as inverted F antennas (IFAs), monopoles, capacitive coupling elements (CCEs), etc.

It will also be appreciated that the term 'operating mode', as provided herein may refer to a wide range of operating conditions. In some cases, different operating modes may be defined by different frequency bands. For example, a first operating mode may correspond to LTE band B7 (i.e., having a pass band for transmission at 2500-2570 MHz and having a pass band for reception at 2620-2690 MHz), while a second operating mode may correspond to LTE band B3 (i.e., having a pass band for transmission at 1710-1785 MHz and having a pass band for reception at 1805-1880 MHz). In other cases, different operating modes may be defined by different communication standard. For example, a first operating mode may correspond to a GSM communication standard, while a second operating mode may correspond to a UMTS communication standard.

Furthermore, although the disclosed antenna structures (e.g., antenna structures 300, 400, 500, and 600) are illustrated as having a number of antennas, the antenna structures are not limited to that illustrated number of antennas. For example, antenna structure 300 is illustrated as having two antennas, 306 and 308. However, the two antennas may be used in combination with additional antennas (e.g., of a MIMO array) coupled to chassis 302, but which are not illustrated.

Figure 4A:
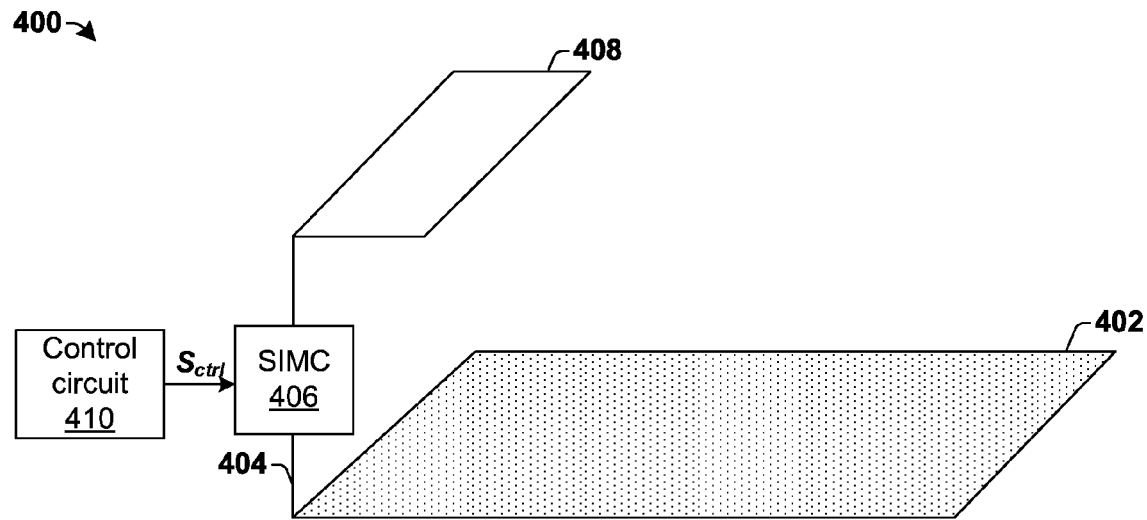
FIG. 4A illustrates a three-dimensional view of an antenna structure having a switchable impedance matching circuit configured to provide a variable quality factor.

FIG. 4A illustrates a three-dimensional view of an alternative example of a disclosed antenna structure 400 configured to dynamically vary a quality factor to support different operating modes.

The antenna structure 400 comprises a chassis 402, a feed line 404, a switchable impedance matching circuit 406, and an antenna 408.

The antenna 408 is coupled to the chassis 402 by way of feed line 404. The switchable impedance matching circuit 406 is coupled to the feed line 404 and is configured to provide a variable impedance to the antenna 408. For example, the switchable impedance matching circuit 406 may be configured to provide a first impedance to antenna 408 or a second impedance to the antenna 408. By varying the impedance of the antenna 408, the Q-factor of the antenna 408 is varied.

A control unit 410 is configured to generate a control signal $S_{ctrl}$ that is provided to the switchable impedance matching circuit 406 to control operation of the plurality of switchable impedance matching circuit depending on a current operating mode of the system. For example, if the system is operating according to a first communication standard the control signal $S_{ctrl}$ will selectively operate the switchable impedance matching circuit 406 to introduce a first impedance to the antenna 408. Alternatively, if the system is operating according to a second communication standard the control signal $S_{ctrl}$ will selectively operate the switchable impedance matching circuit 406 to introduce a second impedance to the antenna 408.

Figure 4B:
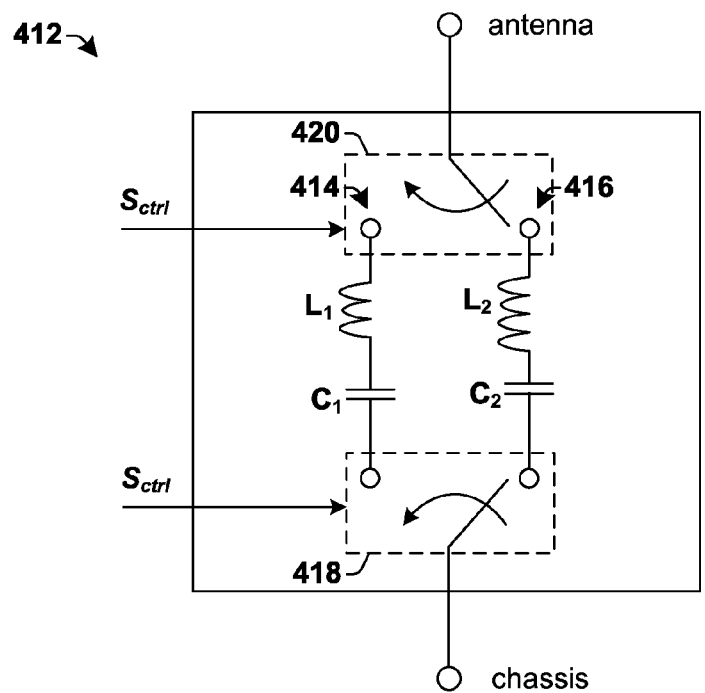
FIG. 4B illustrates a schematic diagram of an exemplary switchable impedance matching circuit.

FIG. 4B illustrates a schematic diagram of an exemplary switchable impedance matching circuit 412. It will be appreciated that the exemplary switchable impedance matching circuit 412 is a non-limiting example of a switchable impedance matching circuit and that in other examples alternative switchable impedance matching circuit may be used.

Switchable impedance matching circuit 412 comprises a first signal path 414 and a second signal path 416. The first and second signal paths, 414 and 416, are configured to provide different impedances to the antenna. For example, the first signal path 414 may comprise a first capacitor $C_1$ having a first capacitance value, and a first inductor $L_1$ having a first inductance value. The second signal path 416 may comprise a second capacitor $C_2$ having a second capacitance value greater than the first capacitance value, and a second inductor $L_2$ having a second inductance value greater than the first inductance value. The higher second capacitance value $C_2$ and inductance value $L_2$ lowers the resonant frequency of the antenna and therefore reduces the Q-factor of the antenna.

The first and second signal paths, 414 and 416, are coupled between a first switching element 418 and a second switching element 420. The first and second switching elements, 418 and 420, are configured to selectively connect the first signal path 414 or the second signal path 416 to the antenna based upon a value of a received control signals $S_{ctrl}$. For example, if the control signal $S_{ctrl}$ has a first value, switching elements 418 and 420 will operate to connect the first signal path 414 to the antenna, while if the control signal $S_{ctrl}$ has a first value, switching elements 418 and 420 will operate to connect the second signal path 416 to the antenna.

Figure 5:
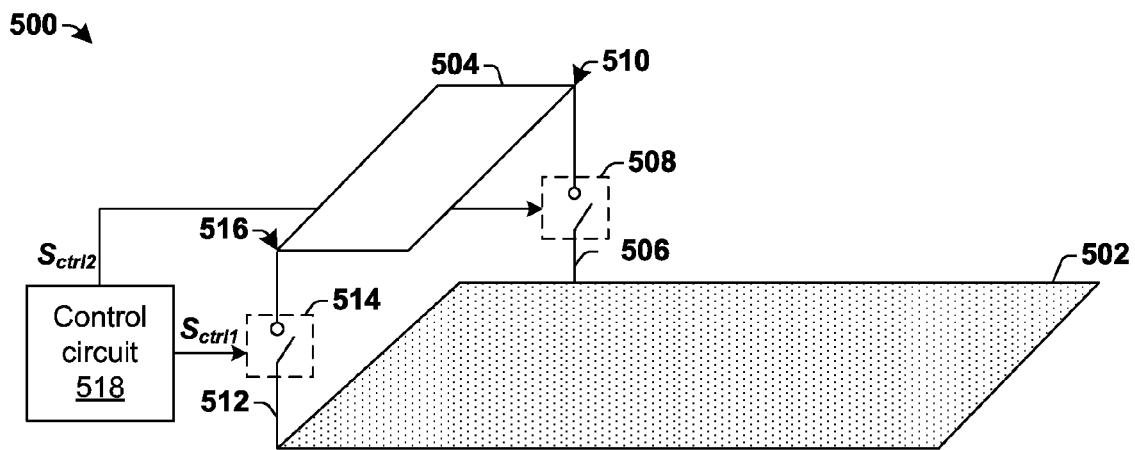
FIG. 5 illustrates a three-dimensional view of an antenna structure having a plurality of variable feed positions configured to provide a variable quality factor.

FIG. 5 illustrates a three-dimensional view of an antenna structure 500 having a plurality of different feed line positions, which vary a quality factor to support different operating modes.

The antenna structure 500 comprises a chassis 502 and an antenna 504. The antenna 504 is selectively connected to the chassis 502 by way of one of a plurality of feed lines, 506 and 512, located at different positions, 510 and 516, on the antenna 504. For example, a first feed line 506 is connected to the antenna 504 at a first position 510, while a second feed line 512 is connected to the antenna 504 at a second position 516 different than the first position 510. Although antenna structure 500 is described in relation to feed lines 506 and 512, it will be appreciated that a connection between the chassis 502 and antenna 504 may also/alternatively be made by way of a short line.

The antenna 504 is configured to selective operate according to different Q factors depending whether a signal is exchanged with the antenna at the first position 510 or at the second position 516. For example, by connecting the chassis 502 to the antenna 504 by way of the first feed line 506, the antenna 504 may operate as a low-Q antenna. Alternatively, by connecting the chassis 502 to the antenna 504 by way of the second feed line 512, the antenna 504 may operate as a high-Q antenna.

In some examples, the first feed line 506 is selectively connected between the chassis 502 and the antenna 504 by way of a first switching element 508, while the second feed line 512 is selectively connected between the chassis 502 and the antenna 504 by way of a second switching element 514. A control unit 518 is configured to generate control signals, $S_{ctrl1}$ and $S_{ctrl2}$, which are provided to the first and second switching elements, 508 and 514. The control signals, $S_{ctrl1}$ and $S_{ctrl2}$, operate to close one of the switching elements, 508 and 514, while opening the other switching element, depending on a mode of operation of the antenna structure 500.

For example, if the system is configured to operate according to a first communication standard the control signals, $S_{ctrl1}$ and $S_{ctrl2}$, will selectively operate the switching elements, 508 and 514, to couple the chassis 502 to the antenna 504 at the first position 510. Alternatively, if the system is configured to operate according to a second communication standard the control signals, $S_{ctrl1}$ and $S_{ctrl2}$, will selectively operate the switching elements, 508 and 514, to couple chassis 502 to the antenna 504 at the second position 516.

Figure 6:
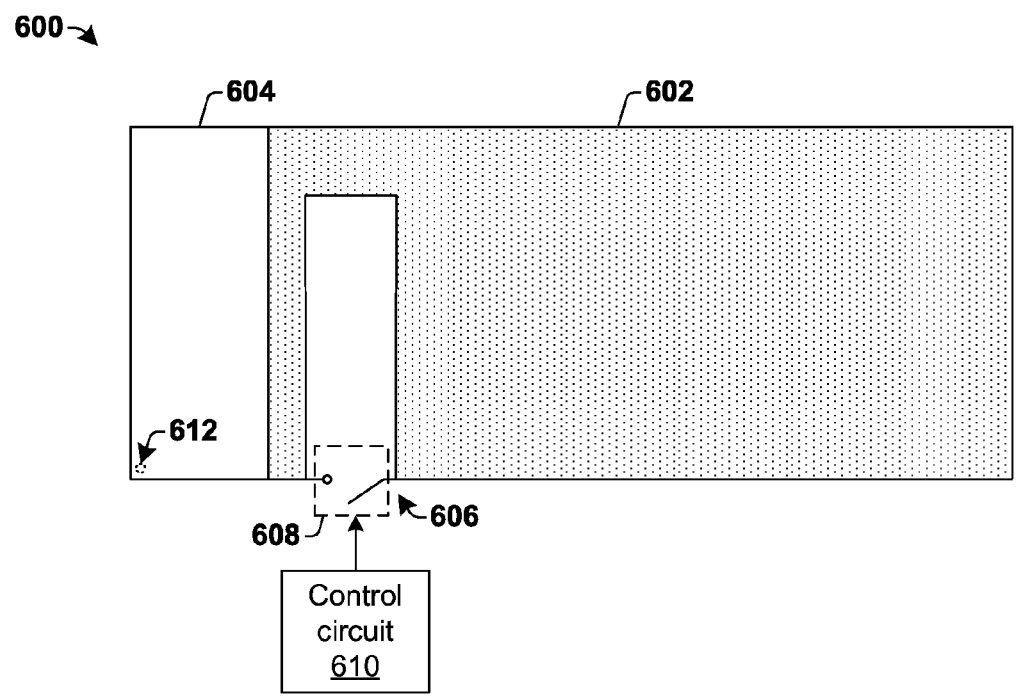
FIG. 6 illustrates a three-dimensional view of an antenna structure having a chassis with a variable electric path configured to provide a variable quality factor.

FIG. 6 illustrates a three-dimensional view of an antenna structure 600 having a chassis 602 with a variable electric path configured to provide a variable quality factor (e.g., isolation level).

The antenna structure 600 comprises a chassis 602 and an antenna 604. The chassis 602 is connected to the antenna 604 by way of a feed line 612. The chassis 602 comprises a slot 606. The slot 606 extends from a bottom edge of the chassis 602 to a lateral position that is above the location of the feed line 612. By extending above the location of the feed line 612, the slot 606 increases the electrical path of the current on the chassis (i.e., increases the length that a signal has to travel through the chassis 602 to reach the feed line 612).

A switching element 608 is configured to selectively short the slot 606. In some examples, the location of switching element is laterally aligned with the feed line 612. A control unit 610 is configured to generate a control signal $S_{ctrl}$ that is provided to the switching element 608 to control operation of the switching element 608. When the switching element 608 is operated in a first state (i.e., a closed state), the slot 606 is short circuited trough the switching element 608, and the electrical path length of the chassis 602 has a first value. The first value of the electrical path length causes the antenna 604 to exhibit a high-Q mode of operation. When the switching element 608 is operated in a second state (i.e., an open state), the slot 606 is not short circuited through the switching element 608, causing the electrical path length of the chassis 602 to have a second value. The second value of the electrical path length causes the antenna 604 to exhibit a low-Q mode of operation.

Figure 7:
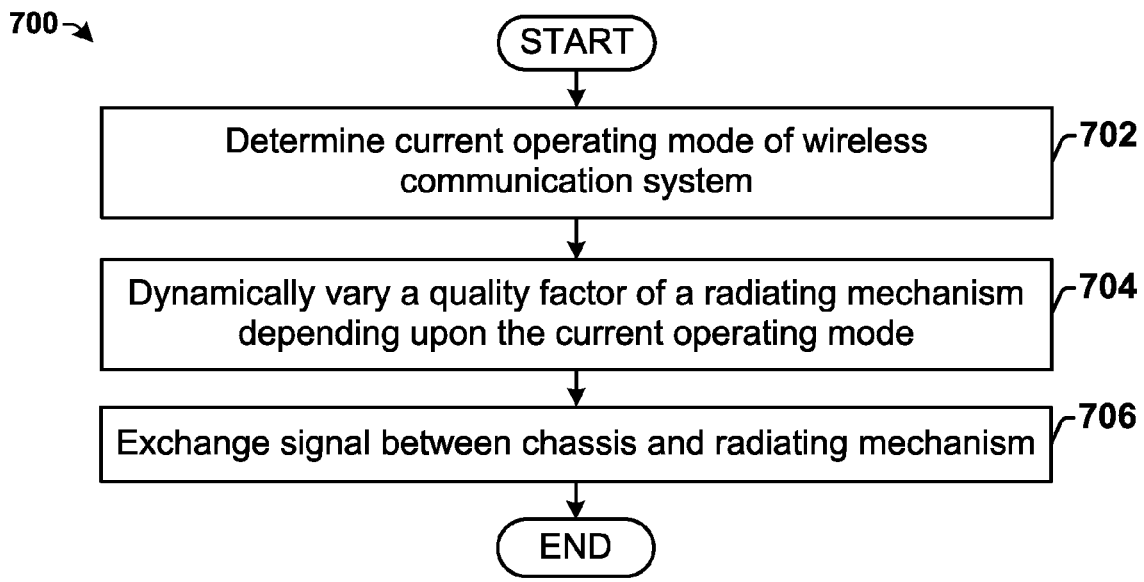
FIG. 7 is a flow diagram of an exemplary method of dynamically varying one or more antenna parameters to support different operating modes of a wireless communication system.

FIG. 7 a flow diagram of an exemplary method 700 to provide dynamically vary one or more variable antenna parameters (e.g., a quality factor) of a wireless communication system to support different operating modes.

While the disclosed method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases At 702, a current operating mode of a wireless communication system is determined. In various examples, the current operating mode may depend upon a communication standard and/or a frequency of operation of the wireless communication system, for example.

At 704, a quality factor of a radiating mechanism is dynamically varied depending upon the current operating mode. For example, if the wireless communication system is operating according to a first operating mode, the quality factor of a radiating mechanism may be set to a first value, while if the wireless communication system is operating according to a second operating mode the quality factor of the radiating mechanism may be set to a second value. Dynamically varying the quality factor of a radiating element may be performed by selectively routing a signal along one of a plurality of different signal paths, wherein the different signal paths are configured to provide the radiating mechanism with different quality factors.

In some cases, the quality factor of the radiating mechanism may be varied by providing the signal to different signal paths connected to different antennas (e.g., to a high-Q antenna or to a low-Q antenna). In other cases, the quality factor of the radiating mechanism may be varied by introducing a variable impedance into the antenna. In other cases, the quality factor of the radiating mechanism may be varied by changing the location at which a signal is provided to an antenna. In yet other cases, the quality factor of the radiating mechanism may be varied by changing the electrical path length of a chassis coupled to an antenna of the radiating mechanism.

At act 706, a signal is exchanged between a chassis and the radiating mechanism. In some examples, the signal is exchanged along a signal path determined according to a quality factor of the radiating element.

It will be appreciated that method 700 may be performed iteratively, so as to dynamically vary the one or more antenna parameters. By dynamically varying the one or more antenna parameters, the method can account for changes to an operating mode of a wireless communication system.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A wireless communication system, comprising:
a signal processing unit;
an antenna structure connected to the signal process unit, wherein the antenna structure comprises:
a radiating mechanism configured to transmit or receive electromagnetic radiation; and
a switchable operating mode element configured to receive a signal and dynamically vary one or more antenna parameters by selectively routing the signal along one of a plurality of signal paths, which respectively provide different antenna parameters to the radiating mechanism, based upon a current operating mode of the wireless communication system; and
a control unit configured to determine the current operating mode based upon a wireless communication standard or a frequency band used by the wireless communication system, and to generate a control signal based upon the current operating mode, which controls operation of the switchable operating mode element.

2. The wireless communication system of claim 1, wherein the one or more antenna parameters comprise a quality factor of the radiating mechanism.

3. The wireless communication system of claim 1, wherein the antenna structure further comprises:
a chassis positioned below the radiating mechanism and comprising a conductive material that is configured to reflect radiation output from the radiating mechanism.

4. The wireless communication system of claim 3,
wherein the radiating mechanism comprises a first antenna having a first quality factor and a second antenna having a second quality factor; and
wherein the switchable operating mode element comprise a switching element configured to selectively couple the chassis to the first antenna or to selectively couple the chassis to the second antenna.

5. The wireless communication system of claim 4,
wherein the first antenna comprises a first planar inverted F antenna (PIFA) having the first quality factor; and
wherein the second antenna comprises a second planar inverted F antenna (PIFA) stacked over the first PIFA and having the second quality factor.

6. The wireless communication system of claim 3,
wherein the radiating mechanism comprises an antenna connected to the chassis by way of a feed line; and
wherein the switchable operating mode element comprise a switchable impedance matching circuit coupled to the feed line and configured to provide a variable impedance to the antenna.

7. The wireless communication system of claim 6, wherein the switchable impedance matching circuit, comprises:
a first signal path configured to provide a first impedance to the antenna;
a second signal path configured to provide a second impedance to the antenna;
a first switching element configured to selectively couple the first signal path or the second signal path to the chassis depending upon the current operating mode; and
a second switching element configured to selectively couple the first signal path or the second signal path to the antenna depending upon the current operating mode.

8. The wireless communication system of claim 3,
wherein the radiating mechanism comprises an antenna;
wherein the switchable operating mode element comprises:
a first switching element configured to selectively couple the chassis to a first position on the antenna; and
a second switching element configured to selectively couple the chassis to a second position on the antenna, wherein the first position and the second position provide for different quality factors to the antenna.

9. The wireless communication system of claim 3,
wherein the chassis is connected to an antenna by way of a feed line;
wherein the chassis comprises a slot that vertically extends from an edge of the chassis to a position that is past feed line, thereby extending an electrical path of the signal provided to the feed line; and
wherein the switchable operating mode element comprise switching element configured to short circuit the slot, wherein the switching element is located at a position that is laterally aligned with the feed line.

10. A wireless communication system, comprising:
a radiating mechanism configured to transmit or receive electromagnetic radiation;
a chassis positioned below the radiating mechanism and comprising a conductive material that is configured to reflect radiation output from the radiating mechanism;
a switchable operating mode element configured to dynamically vary a quality factor of the radiating mechanism; and
a control unit configured to provide one or more control signals to the switchable operating mode element, wherein the one or more control signals vary the quality factor of the radiating mechanism based upon a current operating mode of the wireless communication system,
wherein the control unit is further configured to determine the current operating mode based upon a wireless communication standard or a frequency band used by the wireless communication system, and to generate the one or more control signals based upon the current operating mode.

11. The wireless communication system of claim 10, wherein the switchable operating mode element is configured to receive a signal and to selectively route the signal along one of a plurality of signal paths to dynamically vary quality factor of the radiating mechanism based upon the current operating mode.

12. The wireless communication system of claim 10, further comprising:
wherein the radiating mechanism comprises a first antenna having a first quality factor and a second antenna having a second quality factor; and
wherein the switchable operating mode element comprise a switching element configured to selectively couple the chassis to the first antenna or to selectively couple the chassis to the second antenna.

13. The wireless communication system of claim 10,
wherein the radiating mechanism comprises an antenna connected to the chassis by way of a feed line; and
wherein the switchable operating mode element comprise a switchable impedance matching circuit coupled to the feed line and configured to provide a variable impedance to the antenna.

14. The wireless communication system of claim 10,
wherein the radiating mechanism comprises an antenna;
wherein the switchable operating mode element comprises:
  a first switching element configured to selectively couple the chassis to a first position on the antenna; and
  a second switching element configured to selectively couple the chassis to a second position on the antenna, wherein the first position and the second position provide for different quality factors to the antenna.

15. The wireless communication system of claim 10,
wherein the chassis is connected to an antenna by way of a feed line;
wherein the chassis comprises a slot that vertically extends from an edge of the chassis to a position that is past feed line, thereby extending an electrical path of a signal provided to the feed line; and
wherein the switchable operating mode element comprise switching element configured to short circuit the slot, wherein the switching element is located at a position that is laterally aligned with the feed line.

16. A method of supporting different operating modes in a wireless communication system, comprising:
  determining a current operating mode of the wireless communication system;
  dynamically varying a quality factor of a radiating mechanism depending upon the current operating mode; and
  exchanging a signal between chassis and the radiating mechanism,
  wherein the current operating mode of the wireless communication system is determined based upon a wireless communication standard or a frequency band used by the wireless communication system.

17. The method of claim 16, further comprising:
  selectively routing the signal along one of a plurality of signal paths to dynamically vary quality factor of the radiating mechanism based upon the current operating mode.

* * * * *